United States Patent
Winterhalter et al.

(10) Patent No.: US 7,679,299 B2
(45) Date of Patent: Mar. 16, 2010

(54) TECHNIQUES FOR REDUNDANCY AND FAULT TOLERANCE IN HIGH DEMAND MACHINE SAFETY APPLICATIONS

(75) Inventors: Craig Winterhalter, Cedarburg, WI (US); Robert Harris Schmidt, Germantown, WI (US); Arun K. Guru, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 214 days.

(21) Appl. No.: 11/832,762

(22) Filed: Aug. 2, 2007

(65) Prior Publication Data
US 2009/0033272 A1 Feb. 5, 2009

(51) Int. Cl.
*H02K 41/00* (2006.01)
(52) U.S. Cl. .................. 318/135; 318/400.32; 318/432
(58) Field of Classification Search ............... 318/135, 318/400.32, 432, 603, 652, 653, 721, 799, 318/433, 807, 636, 567, 661
See application file for complete search history.

(56) References Cited

U.S. PATENT DOCUMENTS

2004/0189223 A1* 9/2004 Leonardi et al. ............ 318/268
2006/0097688 A1* 5/2006 Patel et al. .................. 318/778

* cited by examiner

*Primary Examiner*—Karen Masih
(74) *Attorney, Agent, or Firm*—Turocy & Watson LLP; R. Scott Speroff (57) ABSTRACT

Self-sensing feedback functionality for electromechanical actuators/motors is provided for use in operation and/or as a redundant safety mechanism to attain safety certification without adding extra bulk or wiring to the motor. An actuator can be manufactured having one or more saliencies that cause a spatial variance of inductance. A high frequency signal can be injected into the actuator and sampled to determine a current, voltage, or other electrical parameter. The parameter can be evaluated against the known saliencies of the actuator to determine a position of the actuator and/or an associated rotor. Additionally, the position can be evaluated as a function of time to determine a velocity. This can provide an alternative method for operating the electromechanical actuator according to the position/velocity provided. Additionally, this can provide a redundant feedback channel for safety certification without requiring additional actuator parts.

33 Claims, 10 Drawing Sheets

TECHNIQUES FOR REDUNDANCY AND FAULT TOLERANCE IN HIGH DEMAND MACHINE SAFETY APPLICATIONS

TECHNICAL FIELD

The claimed subject matter relates generally to motion control systems and, more particularly, to machine safety and functionality using redundant feedback with motion control systems.

BACKGROUND

Advancements in computer technology and software have enabled communication to occur almost instantaneously. For example, through email an individual in New York can receive a document, image, message, or the like from an individual in California in a matter of seconds. Such advances in technology are not limited solely to communications, but directly or indirectly affect every business and individual. For instance, industrial control systems have enabled modern factories to become partially or completely automated in many circumstances, thereby reducing costs associated with the factory and consequently passing on such cost reduction to a consumer.

To further reduce costs of production, industrial systems have become increasingly automated. For example, programmable logic controllers (PLCs) can be coupled to various machinery and control a process that requires precise timing between actions of such machinery. Additionally, precise knowledge of positioning, velocity, and/or other metrics of the machinery is required as well. To ensure accurate position and velocity information, electromechanical actuators (e.g. motors, etc.) that operate the devices typically have a sensor to detect a position of the actuator for feedback into a controlling device. In the industrial control environment, however, redundancy and fault tolerance can be extremely important to create a safe environment especially where completely automated. To this end, many safety certification standards for electromechanical actuators require additional certification testing for a sensor, additional sensors to create a redundant position operation, a brake to halt an actuator upon position sensor failure, and/or other hardware utilized to ensure safe operation of the actuator upon failure of a position sensor. All of these can create additional burden on manufacture of an electromechanical actuator as they add time to create, test, and certify the actuator, as well as add extra bulk on the actuator, extra cabling, etc. However, the market is increasingly developing more fault tolerant electromechanical actuators with addition of such expensive and time-consuming technologies resulting in a delayed time to market due to testing and development of the disparate technologies.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to using alternative methods of machine feedback, such as self-sensing feedback, to obtain fault tolerance and redundant position/velocity measurement for machine safety applications. The feedback can be generated from within the electromechanical actuator (such as a motor) using spatial saliencies associated with the actuator. For example, a high frequency signal can be injected into the electromechanical actuator (such as from a drive or a component thereof) and sampled to measure a current, voltage, or other electrical parameter. Using the known saliencies, a position can be calculated based on the parameter. The position/velocity information can be determined and transmitted to a controller component and/or a drive component for subsequent control and/or monitoring of the electromechanical actuator. In this regard, the drive can comprise firmware to effectuate the foregoing behavior, thus mitigating the need for extraneous position detection devices to meet redundancy requirements in machine safety applications.

Additionally, the self-sensing functionality can be utilized in conjunction with a position/velocity feedback sensor or encoder that implements a primary position feedback channel for an electromechanical actuator to provide effective fault tolerance. The self-sensing functionality can provide a redundant method of position/velocity determination via a secondary feedback channel to satisfy certain industry safety certification standards. For example, the secondary feedback channel can be used upon failure of the primary feedback channel to operate the electromechanical actuator and/or bring the actuator to a controlled stop. Implementing the secondary feedback channel as part of the electromechanical actuator and/or drive (e.g. in firmware or small hardware, as mentioned above) can mitigate costs associated with manufacturing an actuator, such as traditional costs for added hardware and wiring in a conventional redundant sensor configuration. Additionally, the locally implemented self-sensing functionality can mitigate the need for extra cabling and/or bulk on the electromechanical actuator associated with redundant sensors or encoders. Moreover, required certification analysis of sensors can be mitigated and/or simplified by opening the secondary feedback channel by virtue of the self-sensing position determination as well. Thus, by utilizing the components and methods disclosed herein, electromechanical actuator manufacturing can be less expensive as no significant hardware is required for certified safety and less time-consuming as no new sensors need be built, tested, or certified. Additionally, the actuators can have a decreased time to market in view of the foregoing.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the claimed subject matter when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects of the claimed subject matter may be implemented as a method, apparatus, or article of manufacture using standard programming and/or engineering techniques to produce software, firmware, hardware, or any combination thereof to control a computer to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Self-sensing feedback for measuring one or more metrics of a motion controller is provided where the measured metric(s) can be utilized to facilitate operating the motion controller in one or more regards. The self-sensing feedback can determine the metric(s) and leverage the metric(s) to further control one or more aspects of the motion controller and/or a component thereof. For example, a motion controller can comprise an electromechanical actuator (such as a rotary, linear, or other type of motor/actuator) and a drive (such as an AC (alternating current) drive and/or the like); the position and/or velocity of the actuator can be self-sensed by the drive or actuator (and/or a component thereof), and the information can be utilized by the drive or a controller to operate the electromechanical actuator in a desired manner. In this regard, the self-sensing feedback functionality can be utilized to operate the electromechanical actuator according to a motion control specification, for example, where the electromechanical actuator can be operated in a desired environment. The self-sensed position and/or velocity information can be communicated to an operator and/or an automated operation component to provide the desired movement of the electromechanical actuator. In addition, the self-sensing functionality can be utilized as a redundant sensor-less position/velocity detection system to ensure safe operation of the electromechanical actuator where the actuator can have a primary position detection mechanism. As will be described, this embodiment can also be used to attain certain safety standards by lowering cost, mitigate the need for extra cabling and sensor equipment, and/or reduce time to market for motion controllers.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
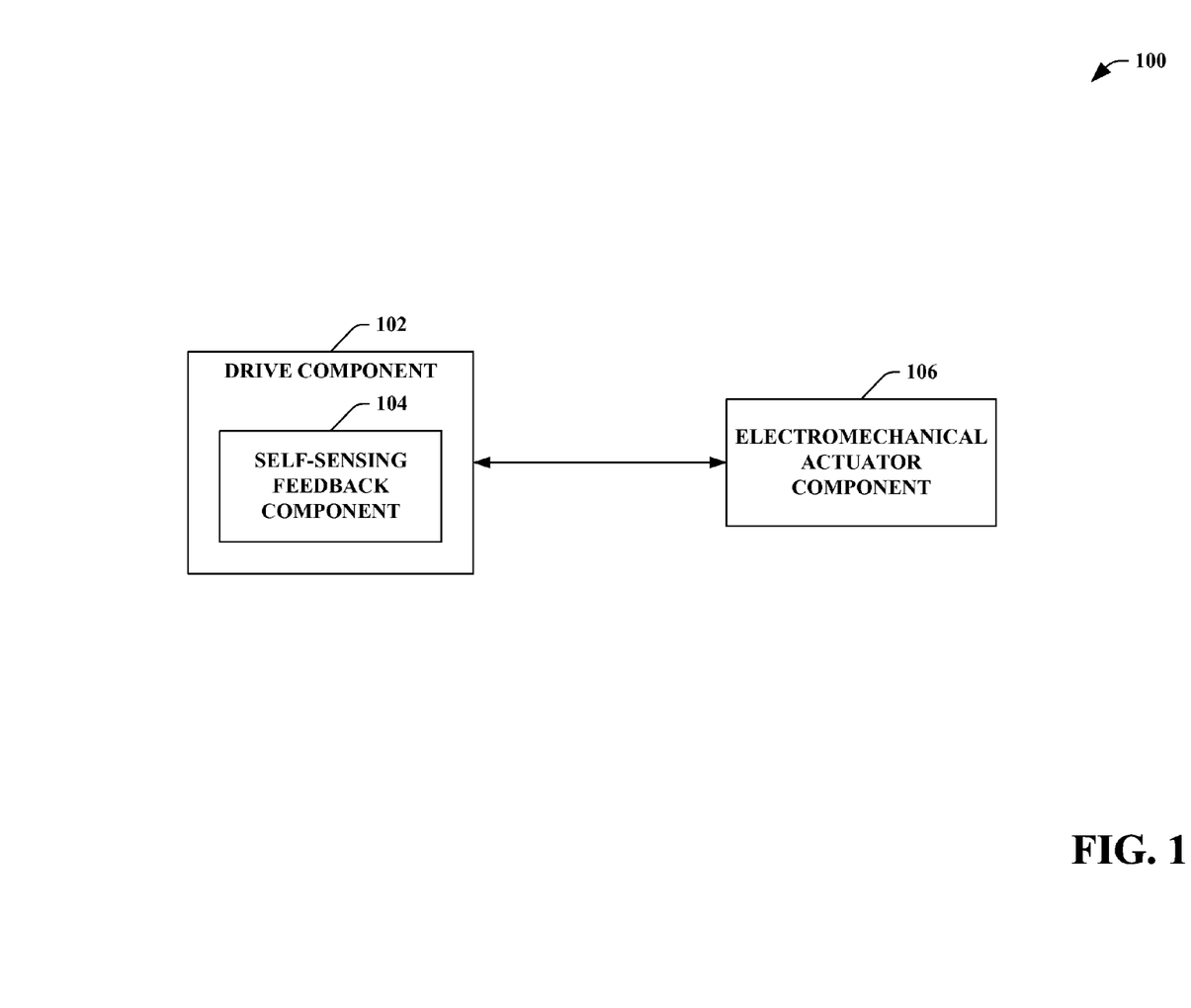
FIG. 1 is a block diagram of a drive and electromechanical actuator combination that facilitates self-sensing feedback operation.

Now turning to the figures, FIG. 1 illustrates a system 100 that facilitates self-sensing functionality in a motion controller environment. A drive component 102 is provided having a self-sensing feedback component 104 to provide the self-sensing functionality and feedback of such for subsequent control, as well as an electromechanical actuator component 106. In one embodiment, the drive component 102 can operate the electromechanical actuator component 106 to provide motion control of a disparate component, such as substantially any automated industrial control device. The self-sensing feedback component 104 can be utilized to obtain information about the electromechanical actuator component 106, such as position and/or velocity, for example, and communicate the information back to the drive component 102 for subsequent control of the electromechanical actuator component 106. As mentioned, the subsequent control can be automatic and/or manual based on the feedback.

For example, in one embodiment, the electromechanical actuator component 106 can control a mechanical arm in an industrial control environment. The position and velocity of the electromechanical actuator component 106 can be important to determine a position and velocity of the mechanical arm to ensure accurate operation. In this embodiment, the drive component 102 can be utilized to operate the electromechanical actuator component 106; thus, feedback to the drive component 102 can affect such operation. In this way, the self-sensing feedback component can be utilized to determine the position and/or velocity of the electromechanical actuator component 106 that is operated by the drive component 102. The position and/or velocity can be sent to the drive component 102 as feedback from the self-sensing feedback component 104 and utilized to control the electromechanical actuator for desired operation. In one embodiment, the position and/or velocity can be relayed to a display for manual operation and/or monitoring of the industrial control device. Additionally, the position and/or velocity can be utilized by an automated control component to automatically operate the industrial control device to perform a given task. It is to be appreciated that the self-sensing feedback component 104 can be utilized to provide a plurality of disparate metrics to components of a motion controller; position and velocity are two examples of possible metrics to measure and communicate for subsequent control of an industrial automation device or motion controller thereof.

The self-sensing feedback component 104 can utilize a plurality of disparate methods for measuring the metrics related to the electromechanical actuator component 106. In one embodiment, the electromechanical actuator component 106 can have a number of deterministic saliencies of a rotor and/or stator associated therewith, for example. In this embodiment, a persistent high frequency excitation can be injected within the electromechanical actuator component 106 such that actuator currents can be sampled to determine rotor position and/or velocity. One way to sample the currents can be by utilizing a high bandwidth noise filter to, for example, cancel out noise other than the injected signal, and an estimator that can determine a relative position based on pre-existing knowledge of saliencies associated with the electromechanical actuator component 106. Also, by sampling positions over time, for example, velocity can be determined by the self-sensing feedback component 104 as well. As described, the metrics can be used to control the electromechanical actuator component 106 and/or the drive component 102 to effectuate a desired operation of the motion controller. It is to be appreciated that other methods can be utilized to determine metrics of the electromechanical actuator as well, such as back-emf sensing, flux calculation methods, observer-based methods, and/or the like. These methods can be utilized by the self-sensing feedback component 104 to measure voltage and/or current to determine position and/or velocity, for example.

Figure 2:
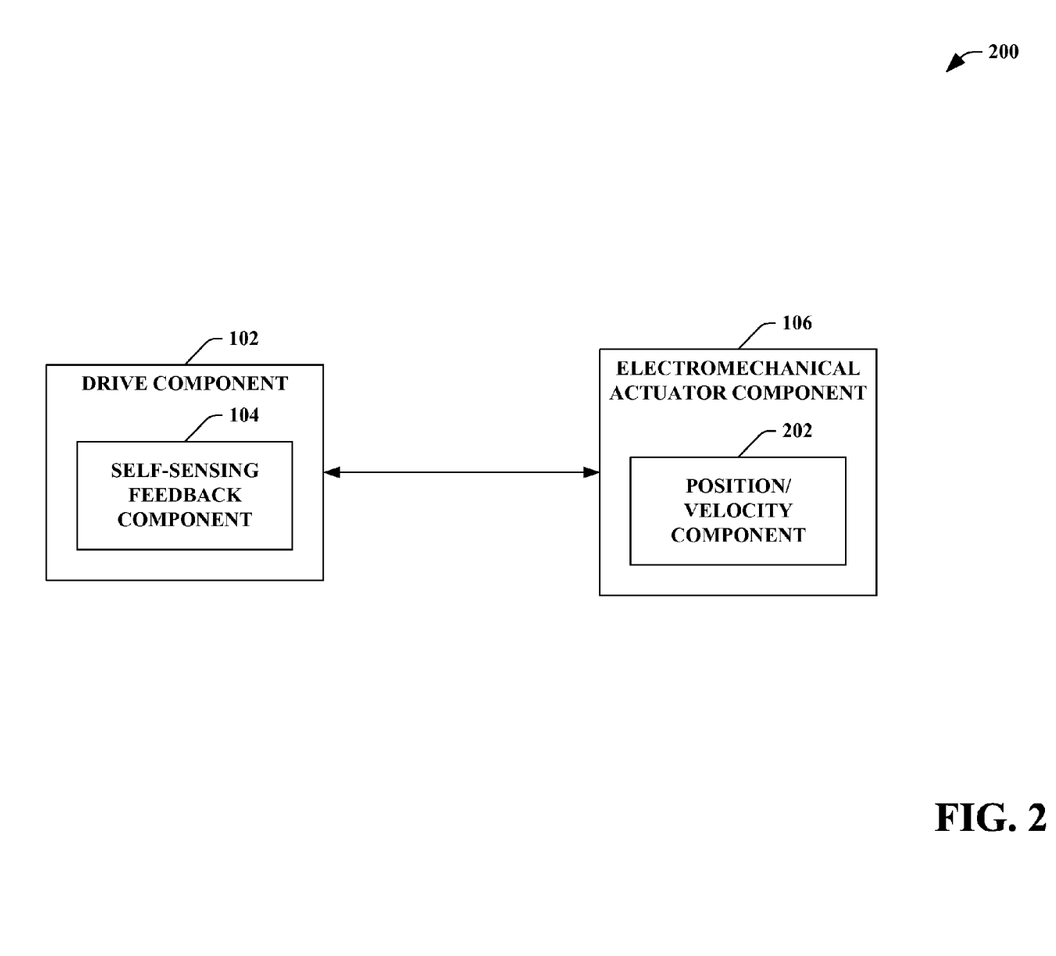
FIG. 2 is a block diagram of a drive and electromechanical actuator combination that facilitates position/velocity determination.

Referring to FIG. 2, a system 200 for ensuring safe operation of a motion controller is shown. A drive component 102 is provided with a self-sensing feedback component 104 for determining metrics with respect to the drive component 102 or electromechanical actuator component 106 for subsequent operation. Additionally, a position/velocity component 202 is provided in the electromechanical actuator component 106 to determine position, velocity, and/or other metrics for operation of the electromechanical actuator component 106 or drive component 102 as well. While in FIG. 1 the self-sensing feedback component 104 can be a primary component in providing position/velocity information for subsequent controlling of the electromechanical actuator component 106 and/or drive component 102, the position/velocity component 202 can be the primary component as well with the self-sensing feedback component 104 as backup (or vice versa, for example).

In one embodiment, a motion controller comprising a drive component 102 and an electromechanical actuator component 106 with position/velocity component 202 can utilize the position/velocity component 202 as a primary feedback channel for control of the electromechanical actuator component 106 and/or drive component 102. Thus, position and velocity information can be obtained using the position/velocity component 202; in this regard, the position/velocity component 202 can be a feedback sensor mounted inside of the electromechanical actuator component 106 (such as on a shaft of the electromechanical actuator component 106) to detect a position of a rotor within the electromechanical actuator component 106. The velocity, for example, can be determined as a function of the rotor position over time. The self-sensing feedback component 104, then, can provide a secondary feedback channel to ensure compliant operation of the position/velocity component 202, for example.

In this embodiment, the secondary feedback channel provided by the self-sensing feedback component 104 can be utilized for a plurality of disparate functions. One such function can be to ensure safe operation of a device utilizing the motion controller comprising the foregoing components. If the position/velocity component 202 fails or is malfunctioning, for example, the self-sensing feedback component 104 can be used to safely bring the electromechanical actuator component 106 to a halt for repair. Additionally, the self-sensing feedback component 104 can be utilized to continue operation of a device until the position/velocity component 202 is repaired. Moreover, the self-sensing feedback component 104 can be utilized to sanity check the position/velocity component 202 for accurate position/velocity determination and/or vice versa, such as for configuration/calibration and/or to ensure position/velocity readings are correct.

It is to be appreciated as well that where safety certification is desired for the motion controller comprising the position/velocity component 202, the self-sensing feedback component 104 can achieve the certification by being the redundant position sensor required by some certifications. Examples of such desired high-demand safety certification standards include EN954-1, EN60204, EN61508, EN61800-2, EN-ISO-13849-1, and the like. Additionally, the self-sensing feedback component 104 can utilize parts of the electromechanical actuator component 106 and drive component 102 that already exist instead of requiring additional parts. In this regard, the self-sensing feedback component 104 can be implemented as hardware, software, and/or within firmware of a component. This can reduce costs associated with a motion controller such as wiring, bulk for other redundant devices, time to market since preexisting components are utilized by the self-sensing feedback component 104, etc.

In one embodiment, as described previously, the self-sensing feedback component 104 can operate as a secondary feedback channel by utilizing one or more techniques to measure position, velocity and/or other metrics of the actuator (such as by back-emf sensing, flux calculation methods, observer-based methods, and/or the like). One technique can involve injecting a high frequency signal into the electromechanical actuator component 106; the electromechanical actuator component 106 can have one or more saliencies known by the self-sensing feedback component 104 to allow measurement of the signal to determine position and/or velocity. As mentioned, this allows preexisting equipment to be leveraged by the self-sensing feedback component 104, which can be implemented in hardware, software, or firmware, such that the self-sensing feedback component 104 need only be added to the drive component 102. Where the self-sensing feedback component 104 is implemented in firmware (such as in preexisting components) or software, the addition of this functionality can require no additional hardware or bulk. Thus, cost is diminished as well as size since in one embodiment, since nothing needs to be added. Additionally, where the self-sensing feedback component 104 is implemented in hardware, the size of the hardware can be extremely small as the component is injecting a frequency signal and measuring such.

It is to be appreciated that the self-sensing feedback component 104, as a secondary feedback channel, can be operating substantially all of the time and/or only when the primary feedback channel fails. Moreover, the self-sensing feedback component 104 can be utilized for fault tolerance, such as to detect short- and/or long-term failure (e.g. electrical noise, power transients, intermittent failures, fretting, corrosion, vibration, other latent and/or constant failures, etc.) of the primary feedback channel. For example, the redundant secondary feedback channel provided by the self-sensing feedback component 104 can be utilized to achieve a high safety integrity level (SIL) according to one or more safety certification standards described above. The SIL can be achieved by utilizing the self-sensing feedback component 104 to provide a safe stop (such as a category 0, 1, and/or 2 stop) where the primary feedback channel is failing, for example. Additionally, zero speed monitoring, safe limited and maximum speeds, switch control enabling, door monitoring and control, safe direction monitoring, safe jog, and/or safe incremental position can also be attained by utilizing the secondary feedback channel provided by the self-sensing feedback component 104 for position/velocity information upon failure of the primary feedback channel (operated by the position/velocity component 202, for example).

Additionally, in one embodiment, primary feedback channel failure can be detected by comparing self-sensing feedback component 104 position/velocity metrics with those produced by the primary feedback channel (the position/velocity component 202) for given points in time, for example. It is to be appreciated that the type and/or severity of failure can also be detected by the comparison (e.g. short-term, long-term and/or intermittent failure). Upon detection of one or more faults, a fault action can be performed. As described previously, the fault action can be to bring the electromechanical actuator component 106 and/or drive component 102 to a coasting stop (such as by removing power) as a response to failure. However, the self-sensing feedback component 104 as a secondary feedback channel can provide more controlled fault actions, such as controlling the electromechanical actuator component 106 and/or drive component 102 to a desirable stop. Additionally, as mentioned, the self-sensing feedback component 104 can become a temporary primary feedback channel to control the electromechanical actuator component 106 and/or drive component 102 to perform desired operations until the position/velocity component 202 is back online (e.g. functioning as desired). This can be especially useful where the primary feedback channel (such as position/velocity component 202) is failing intermittently; in this regard, the self-sensing feedback component 104 can temporarily takeover during intermittent failure (e.g. in a ride through functionality) instead of shutting down the motion control system until the primary channel is repaired to provide maximum throughput.

Figure 3:
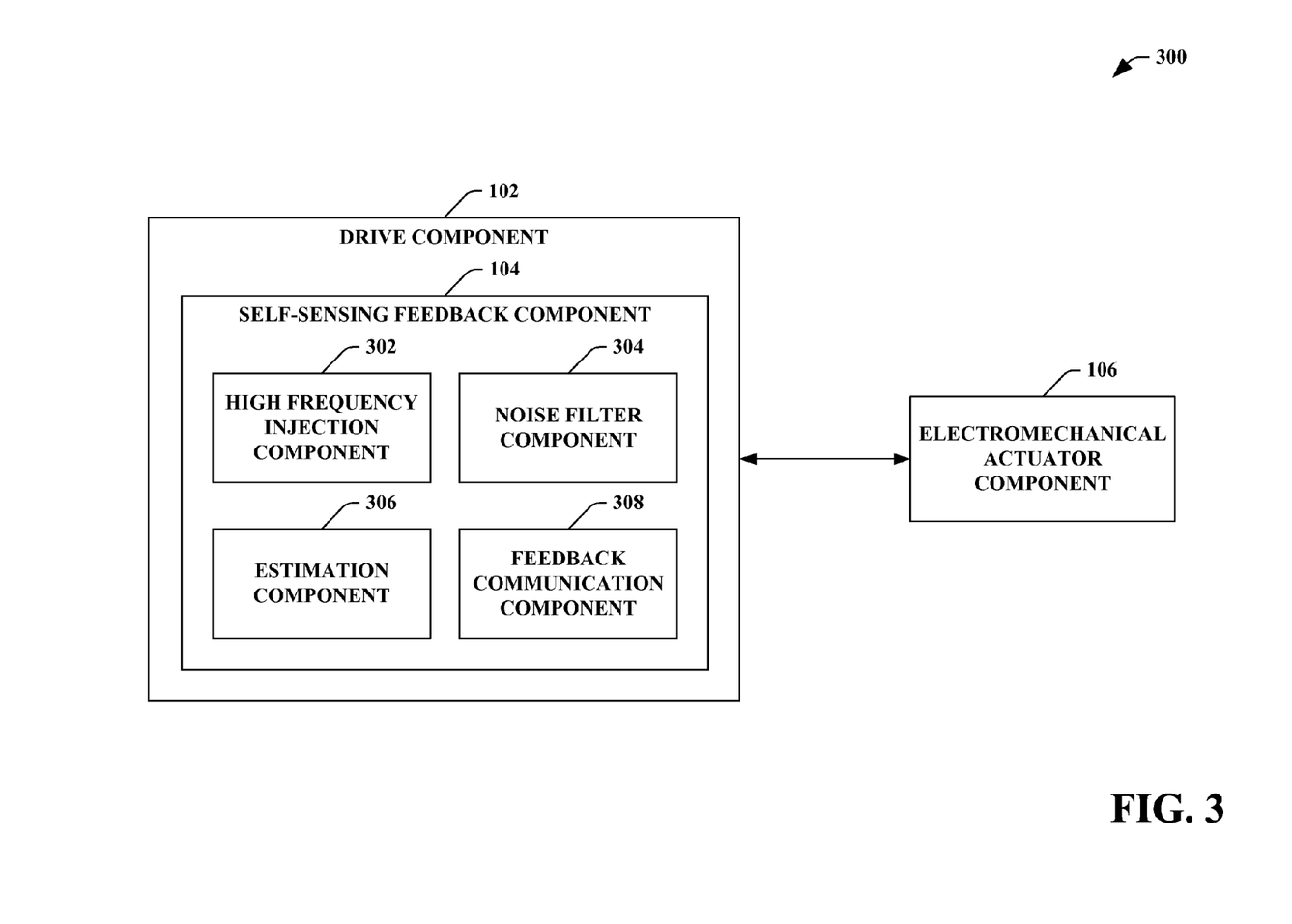
FIG. 3 is a block diagram of a drive and electromechanical actuator combination that facilitates determining actuator position/velocity using known actuator saliencies.

Turning now to FIG. 3, a motion control system 300 that facilitates self-sensing operation is illustrated. A drive component 102 is provided that drives an electromechanical actuator component 106 to effectuate operation of the motion control system (such as to control an industrial automation device, for example). The drive component 102 comprises a self-sensing feedback component 104 (such as in hardware, firmware, and/or software) that can detect a metric for the drive component 102 and/or electromechanical actuator component 106 to control subsequent operation thereof. The self-sensing feedback component 104 comprises a high frequency injection component 302 that can inject a high frequency signal into the electromechanical actuator component 106, a noise filter component 304 to filter out noises other than the high frequency signal, an estimation component 306 that can determine the actuator position and/or velocity based in part on the signal, and a feedback communication component 308 that can transmit gathered data to a disparate device/component for utilization thereof (using substantially any communication technology such as wired and/or wireless network communication, serial communication, light emitting diode, fiber-optic, mechanical communication, etc.).

In one embodiment, the drive component 102 can be an AC drive, for example, and the electromechanical actuator component 106 can be a rotary motor having a stator and rotor where the stator can supply an electric current to the rotor to facilitate torqued rotation thereof. Additionally, the rotor can be connected to a drive shaft to facilitate operation of an industrial device, for example. In this embodiment, the electromechanical actuator component 106 can have one or more saliencies, such as a spatial variation of inductance, associated with the rotor and/or stator that can be used to determine a rotor position; for example, the inductance can change as the motor rotates (or moves, in a linear actuator/motor context). Additionally, deterministic saliencies, such as V-shaped magnets with iron bridges can be used in the design of the rotor and/or stator to achieve a spatial variation in inductance.

The high frequency injection component 302 can be utilized in this embodiment to inject a persistent high frequency signal or excitation into the electromechanical actuator component 106. The saliencies associated with the electromechanical actuator component 106 allows for sampling of the signal to determine position of the electromechanical actuator component 106 (or its associated rotor, for example). The noise filter component 304 can be utilized in this regard to filter out noise other than the high frequency signal as an electromechanical actuator component 106 can generate extraneous noise when in operation. The estimation component 106 can be a control filter, for example, that can measure the position of the electromechanical actuator component 106 (and/or associated rotor) based on sampled currents produced by the injected signal and one or more of preexisting knowledge of actuator saliency, inductance, resistance, pole count, and/or magnetic flux distribution. For example, the position can be determined by measurement of one or more of current, voltage, and/or some other electrical parameter based on sampled currents related to the injected signal. As described, the velocity can also be determined, such as by sampling position over time and/or measuring a variable voltage/current of the electromechanical actuator component 106, for example. The feedback communication component 308 can then submit the determined metrics, such as position and/or velocity, to a disparate component and/or system; the metric(s) can be utilized to control the electromechanical actuator component 106 and/or drive component 102, for example, or another component of an associated motion control system. It is to be appreciated that the feedback communication component 308 can package and/or transmit the metric(s) in substantially any format to effectuate subsequent analysis and/or action based on the metric(s). In this regard, self-control and/or sensor-less control of the drive component 102 and/or electromechanical actuator component 106 can be attained. Additionally, fault tolerance via secondary feedback channel can be attained as well where the secondary feedback channel can be operated by the self-sensing feedback component 104. This can mitigate the need for costly and time-consuming safety certification for a position/velocity sensor or encoder and/or additional sensors or encoders associated with a safety certified motion control system.

As described, the foregoing technology can be implemented within firmware for the drive component 102, for example, such that additional hardware, cables, or other physical attributes are not required, which leads to decreased cost and size. As technology keeps evolving towards adding sensors and/or other devices for redundant fault tolerance, the foregoing technology can leverage preexisting physical components with self-sensing feedback techniques implemented in firmware or software to provide such redundant fault tolerance and/or basic sensor-less control of a motion control system. In this regard, need for stringent certification requirements of sensors (e.g. mechanical slippage), appropriate diagnostics, and manufacturing methods are also mitigated. This, in turn, mitigates need for added complexity, components, costs, time to market, additional configuration, and other associated costs of motion control systems. Moreover, mechanical brakes can be eliminated as the self-sensing feedback component 104 can continue to operate and/or effectuate controlled stopping of the electromechanical actuator component 106 and/or drive component 102 in the event of a fault.

It is to be appreciated that the electromechanical actuator component 106 can be rotary, as described, linear, and/or substantially any other type of actuator or motor that can have saliencies such that injection of a high frequency signal can be sampled to determine position of the actuator/motor based on the saliencies. For example, the electromechanical actuator component 106 can be a linear actuator/motor having a drive component 102 and a self-sensing feedback component 104. The high frequency injection component 302 can inject a high frequency signal in the electromechanical actuator component 106; the signal can be filtered by a noise filter component 304. The estimation component 306 can subsequently estimate a current, voltage, or other electrical parameter to determine a position of the actuator and/or a stage propelled by the motor. The feedback communication component 308 can subsequently transmit position information to one or more components to effectuate sensor-less or self-sensing control of the electromechanical actuator component 106 and/or drive component 102. Additionally, this can provide for cable-less control of a linear actuator/motor and propelled stage as the position is detected within the motion control system itself and not by position information transmitted from the stage. In this regard, the stage of the linear motor can be without a transmission means. Alternatively, the stage can have a transmission means and the self-sensing feedback component 104 can be a secondary feedback channel as described previously providing fault tolerance, detection, and the like.

Figure 4:
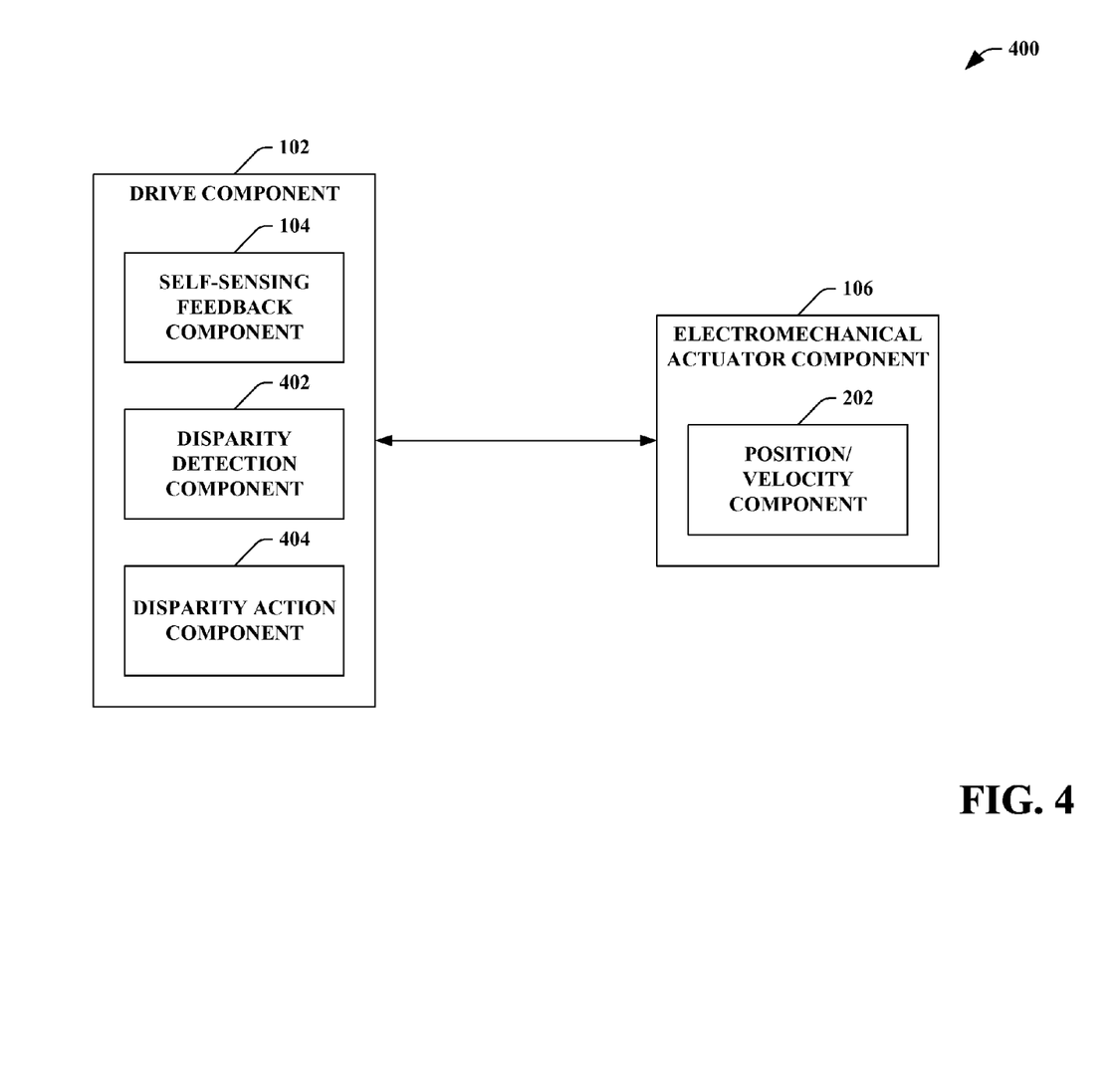
FIG. 4 is a block diagram of a drive and electromechanical actuator combination that facilitates determining disparities in redundant position/velocity determining.

Turning now to FIG. 4, an example system 400 for detecting disparities in feedback channels is displayed. A drive component 102 is provided to drive an electromechanical actuator component 106; the drive component comprises a self-sensing feedback component 104 to determine one or more metrics regarding the drive component 102 and/or electromechanical actuator component 106. The self-sensing feedback component 104 can act as a secondary feedback channel to effectuate control of the drive component 102 and/or electromechanical actuator component 106 where a position/velocity component 202 provided with the electromechanical actuator component 106 can be the primary feedback channel. It is to be appreciated that the configuration can be reversed as well. Additionally, the drive component 102 further comprises a disparity detection component 402 that can detect disparities between information received from the feedback channels and a disparity action component 404 that can take one or more actions according to the disparity in the received information.

In one embodiment, the position/velocity component 202 and self-sensing feedback component 104 can implement a fault tolerant feedback architecture as described herein where the self-sensing feedback component 104 stays active as a secondary feedback channel to ensure correct operation of the position/velocity component 202. In this implementation, the feedback channels can measure one or more actuator/motor metrics (such as position, velocity, etc.) at substantially the same points in time for comparison thereof. In this regard, the disparity detection component 402 can be utilized to determine if there is a disparity in the reported metric(s) indicating failure of one or more of the components operating the channels. For example, the disparity detection component 402 can determine reported positions are different for a given point in time and forward the information to the disparity action component 404. The disparity action component 404 can decide whether to take an action and which action to take. For example, if the positions reported are minor in difference (e.g. the disparity does not pass a threshold), the disparity action component 404 can ignore the disparity. If the disparity is determined to be critical, however, the disparity action component 404 can take an action to cure the disparity based at least in part on the disparity and/or a motion control system context.

For example, a motion control system can comprise the drive component 102 and an electromechanical actuator component 106. If the motion control system is in a startup mode, or perhaps if the position/velocity component 202 was replaced, a reported disparity can be related to a calibration and/or configuration issue. In this regard, the disparity action component 404 can utilize position information reported by the self-sensing feedback component 104 to automatically calibrate and/or configure the position/velocity component 202. Additionally, the disparity can be related to failure of the position/velocity component 202. In this case, for example, the disparity action component 404 can take a plurality of disparate actions; one action can be to switch to the secondary feedback channel operated by the self-sensing feedback component 104 to control the actuator for a period of time or to a controlled stop. Additionally, the disparity action component 404 can report the failure of the position/velocity component 202 to a disparate component for notification and/or automated repair. Moreover, the disparity action component 404 can receive an input on what action to take; for example, if the primary feedback channel reported a disparate position indicating failure of such, the secondary feedback channel can be utilized to operate the motion control system while waiting for instruction on what action to take. In one embodiment, the specified action can be to continue to operate the motion control system using the secondary feedback channel operated by the self-sensing feedback component 104 until the position/velocity component 202 is back online (e.g. by repair and/or replacement). At this point, the self-sensing feedback component 104 can also be used to configure/calibrate the repaired/replaced sensor if desired, for example.

Figure 5:
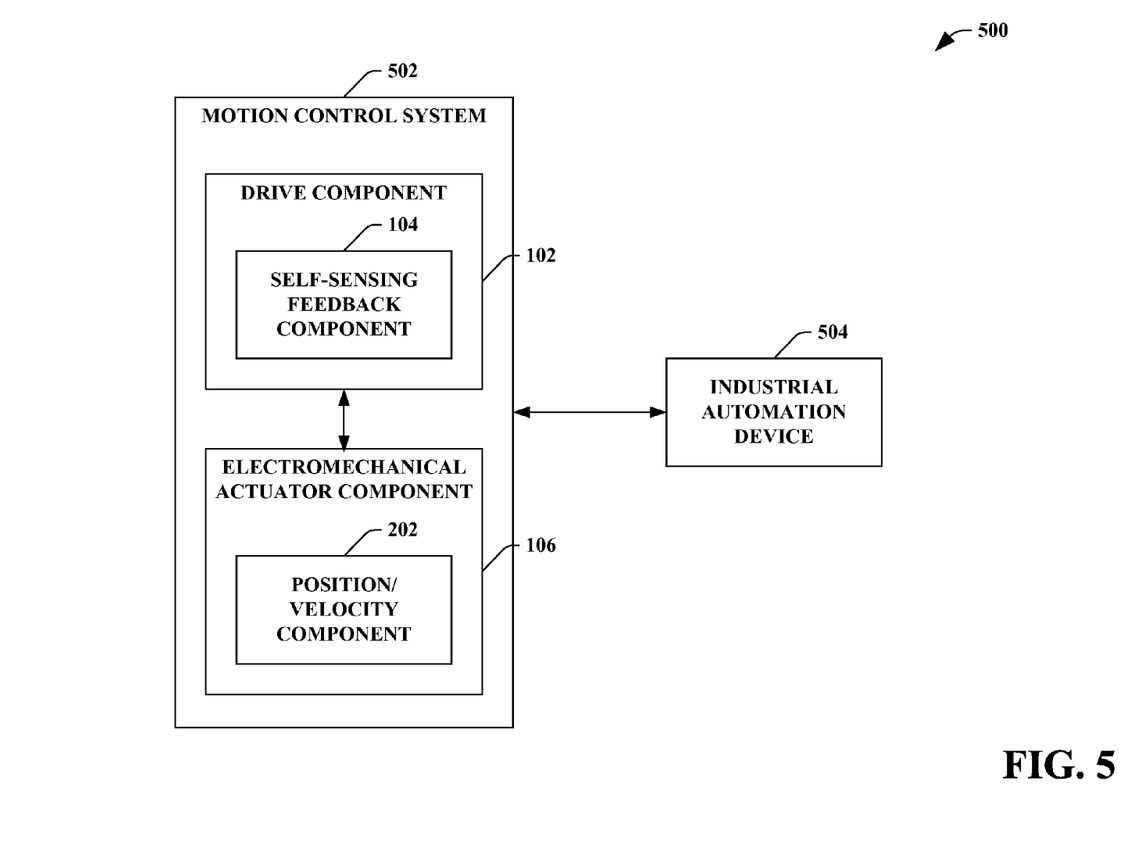
FIG. 5 is a block diagram of a motion control system using a self-sensing drive and electromechanical actuator combination.

Referring to FIG. 5, a system 500 that facilitates utilizing sensor-less operation and/or redundant feedback in an industrial automation environment is illustrated. A motion control system 502 is provided comprising a drive component 102 that drives an electromechanical actuator component 106 for operation of an industrial automation device 504. The drive component 102 has a self-sensing feedback component 104 for sensor-less operation of the electromechanical actuator component 106 and/or to provide a redundant feedback channel for a position/velocity component 202 that can be present in the electromechanical actuator component 106.

In one embodiment, the industrial automation device 504 is controlled by the motion control system 502. The industrial automation device 504 can be substantially any device controlled by an electromechanical actuator (e.g. a motor), such as electromechanical actuator component 106, and used in an industrial environment to perform an automated task. Safety in such an environment can be of paramount importance; thus, the self-sensing feedback component 104 can provide a secondary feedback channel in case of failure of a primary feedback channel such as that operated by the position/velocity component 202 as described above in various embodiments and figures. Additionally, the self-sensing feedback component 104 can be utilized to solely operate the industrial automation device 504 through manual and/or automatic control, for example.

Figure 6:
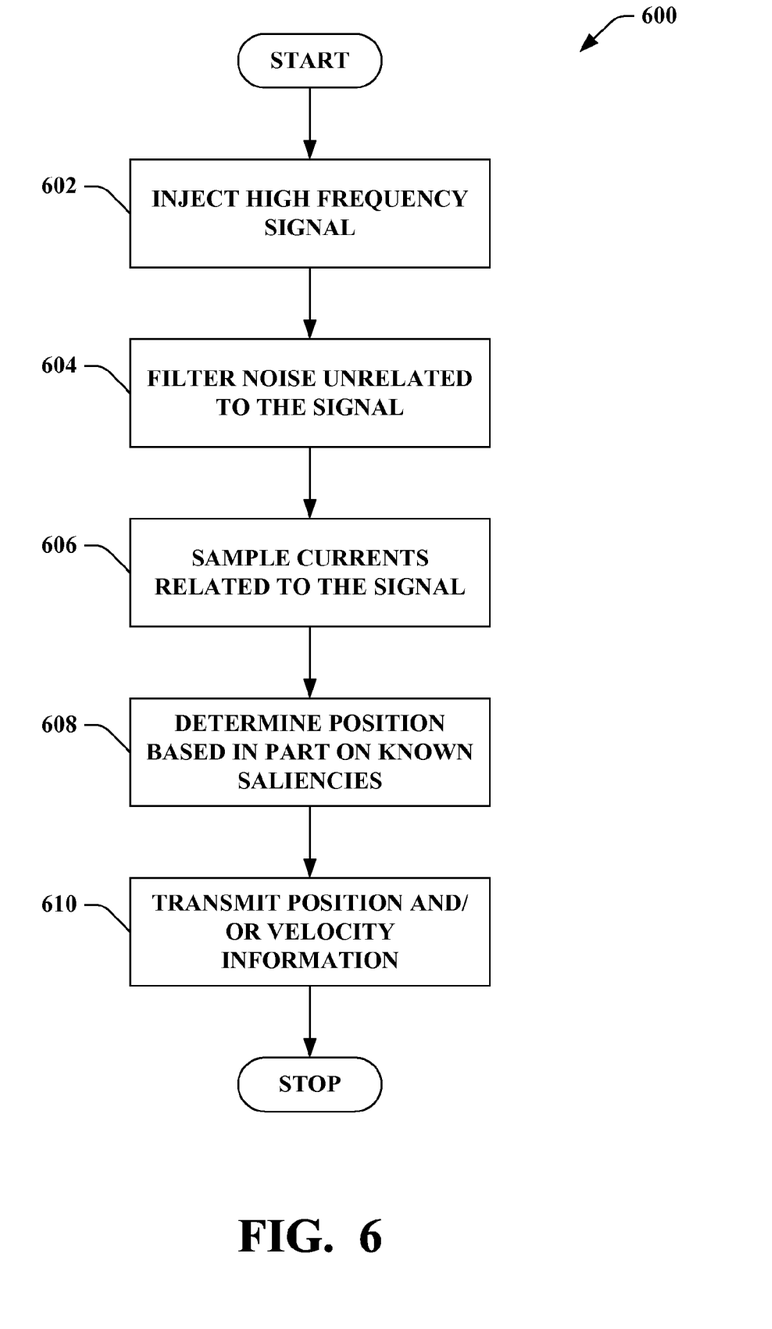
FIG. 6 is a representative flow diagram illustrating a methodology for operating an electromechanical actuator via self-sensing feedback.
Figure 7:
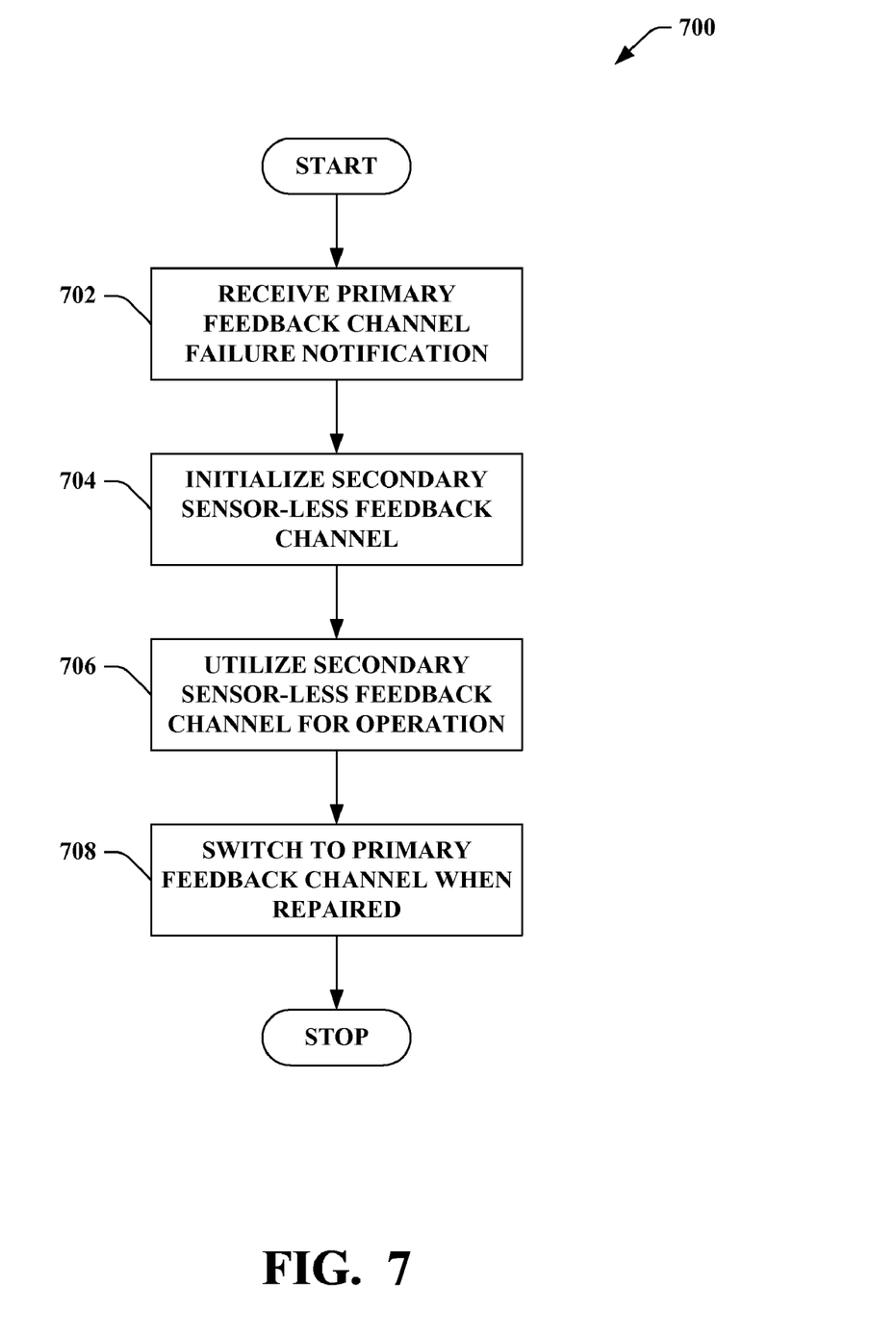
FIG. 7 is a representative flow diagram illustrating a methodology for utilizing a secondary feedback channel for electromechanical actuator fault tolerance.
Figure 8:
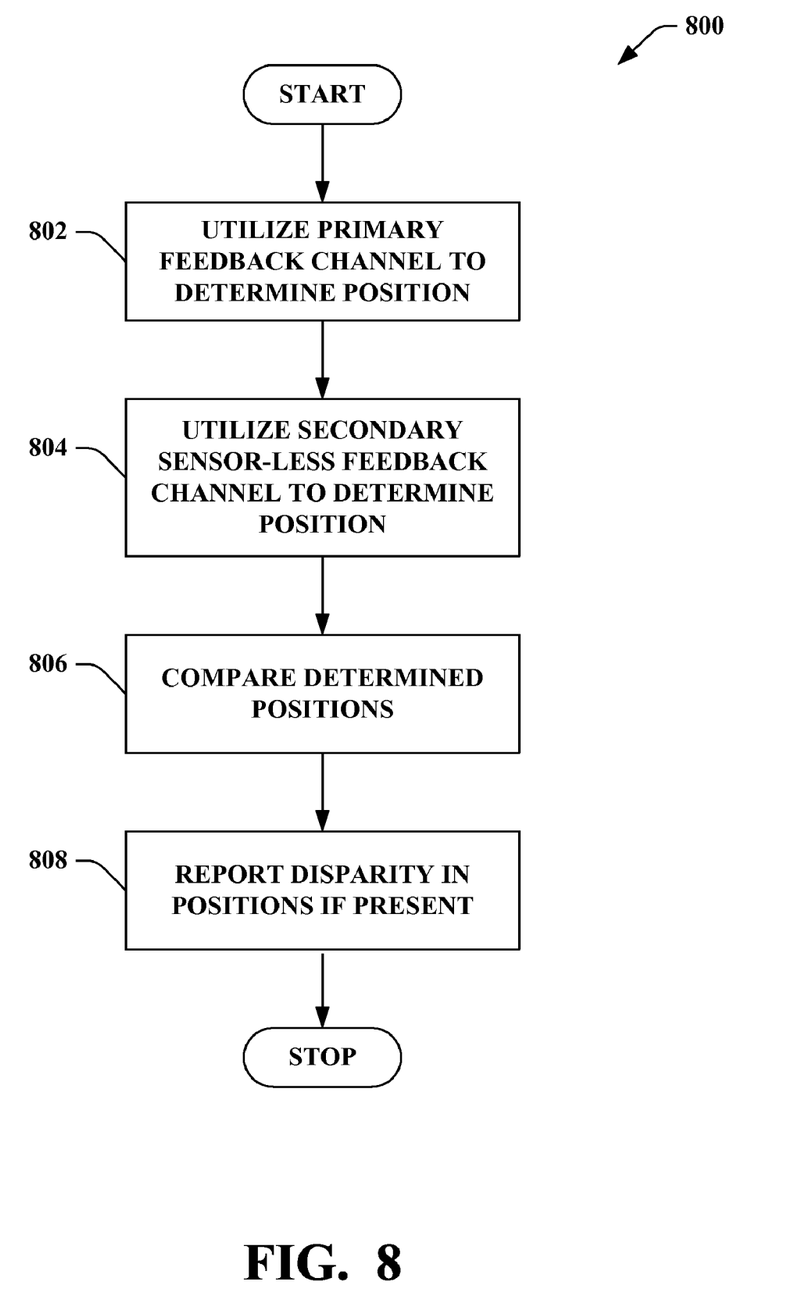
FIG. 8 is a representative flow diagram illustrating a methodology for detecting and handling a fault in an electromechanical actuator feedback channel.

Referring to FIGS. 6-8, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 6, a methodology 600 for using self-sensing sensor-less information to control an electromechanical actuator is illustrated. In one embodiment, for example, this can be an actuator of a motion control system having a drive (such as an AC drive) as shown herein. At 602, a high frequency signal can be injected into the electromechanical actuator; the actuator can have deterministic saliencies, for example, that define a spatial variance of inductance. One example of such saliencies can be V-shaped magnets with iron bridges on a rotor and/or stator structure of the actuator (in a rotary motor implementation). It is to be appreciated that the saliencies can also be present in a linear motor implementation to facilitate the self-sensing sensor-less operation as well. At 604, noise unrelated to the high frequency signal can be filtered out such that it does not interfere with sampling the signal in subsequent steps, for example. In this regard, electromechanical actuators can generate significant extraneous noise in some implementations; thus, the high frequency signal can be sampled without having to deal with the extraneous noise.

At 606, currents related to the signal can be sampled to measure a voltage, current, and/or other electrical parameter. The measured parameter can be utilized at 608 to determine position based in part on known saliencies of the electromechanical actuator. Since the saliencies and their respective positions are known, the position of the actuator can be detected using the measured parameters from the sample. It is to be appreciated that by detecting position, velocity can be detected as well by evaluating the position as a function of time. At 610, position and/or velocity information can be transmitted. For example, the information can be transmitted to a device that controls the electromechanical actuator and/or a drive for the actuator to effectuate self-sensing sensor-less control thereof, the device can be manual and/or automatic. Additionally, the information can be transmitted to other devices for reporting and/or evaluation/analysis. In one embodiment, the position information can be utilized in a secondary feedback channel for the electromechanical actuator, for example.

With reference now to FIG. 7, a methodology 700 for implementing fault tolerance in an electromechanical actuator, such as a motor, is illustrated. In this methodology 700, a redundant method of handling faults is provided to mitigate costs associated with actuator manufacturing. Such costs can include extra hardware and wiring, increased testing time to comply with safety specifications, increased implementation, increased time to market for the electromechanical actuator, and the like. These costs can be mitigated by providing secondary feedback without adding additional hardware to the actuator. At 702, a primary feedback channel failure notification is received. This event can be received by a drive for the electromechanical actuator, for example (such as an AC drive). Upon receiving the event, at 704 a secondary sensor-less feedback channel can be initialized. The secondary sensor-less feedback channel can be implemented by components and methods described herein, for example, where position information can be detected using signal injection into preexisting parts and sampling the signal according to known saliencies of the electromechanical actuator.

At 706, the secondary sensor-less feedback channel can be utilized for operation, such as to control the electromechanical actuator, for example. In this regard, the actuator can be controlled to perform desired tasks in the absence of the primary feedback channel by utilizing the sensor-less feedback channel as described above. The secondary sensor-less feedback channel can provide sufficient position information to continue operating the electromechanical actuator and drive, for example. Additionally, the secondary sensor-less feedback channel can be used to safely stop the actuator, and/or industrial device connected thereto, in a controlled manner. This can be desired where the primary feedback channel failure is long-term, for example. At 708, after the primary feedback channel is repaired, control of the electromechanical actuator can use position information from the primary feedback channel instead of or in addition to that from the secondary feedback channel, for example.

Referring to FIG. 8, a method 800 for providing fault detection for an electromechanical actuator utilizing a secondary sensor-less feedback channel is illustrated. At 802, a position of the actuator can be determined (such as a rotor in a rotary motor context) from a primary feedback channel. The primary feedback channel can be, for example, an encoder or sensor mounted in the electromechanical actuator to determine a position of the shaft and/or rotor, for example. At 804, a position is received from a secondary sensor-less feedback channel; as described above, this can be implemented using preexisting parts of an electromechanical actuator by injecting a high frequency signal therein and sampling the signal to measure a current, voltage, or the like to determine position based on saliencies of the actuator. Thus, the added functionality can be implemented in firmware mitigating the need for extra parts or cables (and therefore bulk). The positions can be taken at substantially the same point in time and compared to ensure accuracy at 806. The positions can have room for some error, for example, to account for disparities in algorithms of the two components. If there is a disparity in the positions, it can be reported at 808. Such a disparity can indicate fault in one or more of the feedback channels and such can be relayed to another component or display, for example. If there is a disparity, control can be transferred to the device operating the secondary feedback channel, for example, until the primary is fixed. It is to be appreciated that the sensor or encoder can be the secondary channel as well, and the self-sensing or sensor-less component can be the primary feedback channel.

Figure 9:
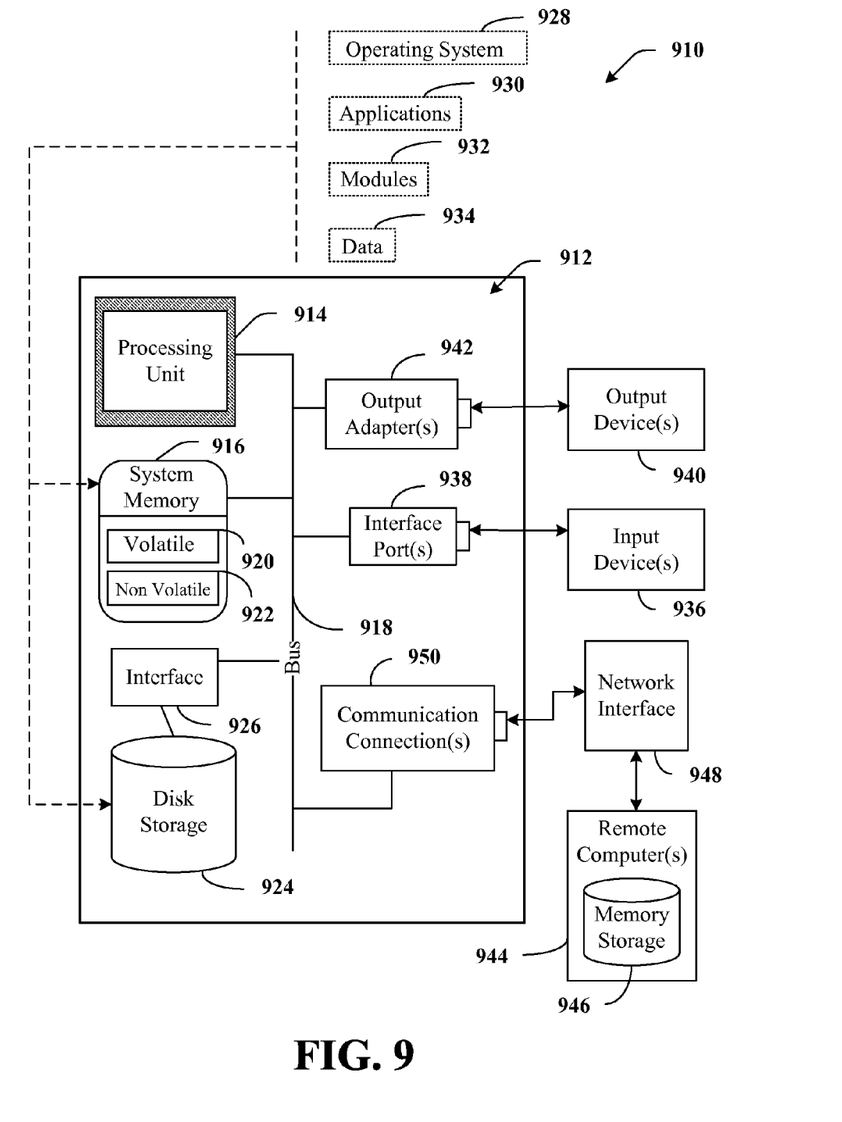
FIG. 9 is an example computing environment.

With reference to FIG. 9, an example environment 910 for implementing various aspects of the claimed subject matter is shown. For example, the self-sensing or sensor-less functionality can be implemented at least in part by software using an environment such as 910. Additionally, the subject matter as described can be utilized in computer simulation of an industrial automation environment using environment 910. The environment 910 includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable PROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject matter as described can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
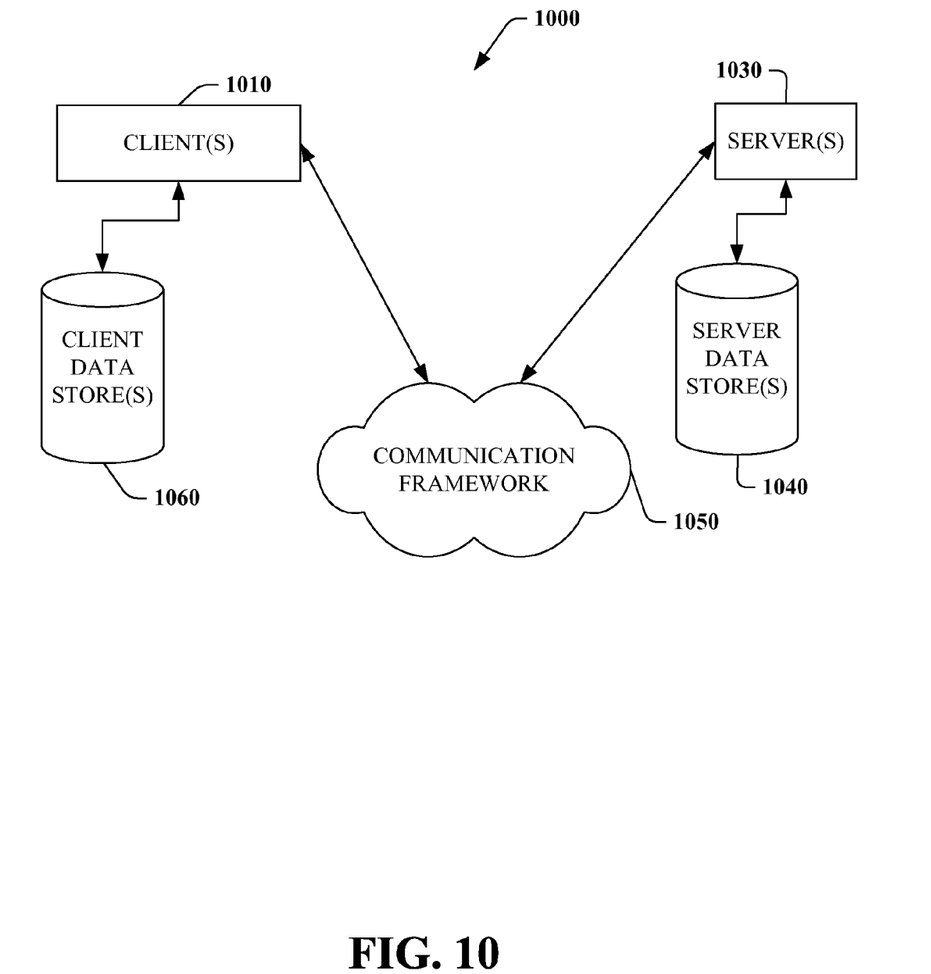
FIG. 10 is an example networking environment.

FIG. 10 is a schematic block diagram of a sample-computing environment 1000 with which the subject matter as described can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the described subject matter, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for satisfying a safety certification for a motion controller, comprising:
    a self-sensing feedback component that measures one or more of a position or velocity of an electromechanical actuator of a motion control system according to one or more spatial saliencies related to the electromechanical actuator and achieves at least a safety certification by acting as a redundant position sensor as required by one or more safety certifications; and
    a drive component that controls the electromechanical actuator based on a position/velocity sensor comprised therein, the drive component controls the electromechanical actuator based at least in part on the position and/or velocity measured by the self-sensing feedback component upon a fault occurring within the position/velocity sensor.

2. The system of claim 1, the self-sensing feedback component utilizes a high frequency injection component to facilitate measuring the position and/or velocity of the electromechanical actuator, the high frequency injection component injects a high frequency signal into the electromechanical actuator and samples the signal according to the one or more saliencies related to the electromechanical actuator.

3. The system of claim 2, the one or more saliencies cause a spatial variation of inductance within the electromechanical actuator.

4. The system of claim 2, at least one of the saliencies is a V-shaped magnet with one or more iron bridges.

5. The system of claim 2, further comprising an estimation component that utilizes the sampling of the signal to measure a current or voltage of the electromechanical actuator related to the high frequency signal.

6. The system of claim 1, the electromechanical actuator is a linear motor.

7. The system of claim 1, the electromechanical actuator is a rotary motor.

8. The system of claim 1, the position and/or velocity measured by the self-sensing feedback component is used for fault tolerance upon failure of the position/velocity sensor.

9. A method for providing self sensing feedback to satisfy a safety certification in a motion control system, comprising:
    measuring an electrical parameter of an electromechanical actuator with a self-sensing feedback mechanism;
    estimating a position and/or velocity of the electromechanical actuator based at least in part on the electrical parameter and known saliencies associated with the electromechanical actuator;
    utilizing the position and/or velocity to control the electromechanical actuator in a fault event with respect to a primary position/velocity sensor on the electromechanical actuator;
    achieving at least one safety certification for the electromechanical actuator by utilizing the self-sensing feedback mechanism as a redundant sensor required by the safety certification.

10. The method of claim 9, further comprising:
    injecting a high-frequency signal into the electromechanical actuator; and
    filtering noise unrelated to the signal, the signal is measured in estimating the electrical parameter.

11. The method of claim 9, the electrical parameter is at least one of a current of the electromechanical actuator, a voltage of the electromechanical actuator, a pole count of the electromechanical actuator, or a magnetic flux distribution.

12. The method of claim 9, further comprising switching control to the primary position/velocity sensor upon repair of the primary position/velocity sensor.

13. A system for providing self-sensing determination of position information for satisfying a safety certification in a motion controller, comprising:
    means for injecting a high-frequency signal into a motor;
    means for measuring an electrical parameter according to the signal;
    means for determining a position of the motor based on the electrical parameter and at least one saliency of the motor such that the position determining means is a redundant position sensor required by at least one safety certification; and
    means for controlling the motor upon failure of a primary position/velocity measuring component.

14. A system for providing redundant fault tolerance in a motion controller, comprising:
    an electromechanical actuator component having an attached position/velocity component to determine one or more of a primary position or velocity of the electromechanical actuator component; and
    a drive component that controls the electromechanical actuator component, the drive component comprises a self-sensing feedback component that determines a secondary position and/or velocity of the electromechanical actuator such that the self-sensing feedback mechanism satisfies a requirement for one or more redundant sensors in accordance with at least one safety certification.

15. The system of claim 14, the self-sensing component comprises a high-frequency injection component that injects a high frequency signal into the electromechanical actuator.

16. The system of claim 15, the self-sensing component further comprises an estimation component that estimates the position or velocity of the electromechanical actuator based at least in part on measuring an electrical parameter affected by the signal.

17. The system of claim 16, the estimation component estimates the position based further on one or more saliencies of the electromechanical actuator, the saliencies affect a spatial variation of inductance related to the electromechanical actuator.

18. The system of claim 14, the self-sensing feedback component uses at least one of back-emf sensing, flux calculation methods, and/or observer-based methods to determine the secondary position and/or velocity of the electromechanical actuator.

19. The system of claim 14, the self-sensing feedback component is utilized as a primary feedback channel for the electromechanical actuator upon failure of the position/velocity component.

20. The system of claim 19, the self-sensing component is used to bring the electromechanical actuator to a controlled stop.

21. The system of claim 19, the self-sensing component controls the electromechanical actuator to complete at least one desired task.

22. The system of claim 14, the primary and secondary positions and/or velocities are substantially equivalent.

23. The system of claim 14, primary and secondary positions and/or velocities are compared for detection of a fault within the position/velocity component.

24. The system of claim 14, the secondary position and/or velocity is used to calibrate the position/velocity component.

25. The system of claim 14, the electromechanical actuator is a linear motor.

26. The system of claim 14, the self-sensing feedback component is implemented in firmware of the drive component.

27. A method for providing fault tolerance in a motion control system, comprising:
    receiving a primary feedback channel failure event for an electromechanical actuator;
    initializing a secondary feedback channel of the electromechanical actuator;
    measuring an electrical parameter of the electromechanical actuator;
    determining a position from the electrical parameter and at least one known saliency of the electromechanical actuator;
    transmitting the position across the secondary feedback channel; and
    achieving a safety certification by implementing the secondary feedback channel.

28. The method of claim 27, further comprising controlling the electromechanical actuator based at least in part on the transmitted position.

29. The method of claim 27, the electrical parameter is an inductance of the electromechanical actuator and the saliency relates to a spatial variation in the inductance of the electromechanical actuator.

30. The method of claim 27, further comprising switching position determination to a device of the primary feedback channel upon an associated restore event.

31. A system for providing fault tolerance in a motion controller, comprising:
    means for providing a primary position feedback for a motor, the position information determined by the primary position feedback providing means is used in controlling the motor; and
    means for providing a secondary position feedback that is utilized upon failure of the primary position feedback means wherein the secondary position feedback means provides a redundant position measurement that facilitates at least a safety certification of the motor.

32. The system of claim 31, the means for self-sensing the position, further comprising:
    means for injecting a high-frequency signal in the motor;
    means for measuring an electrical parameter affected by the signal; and
    means for determining the position based at least in part on the electrical parameter and at least one known saliency of the motor.

33. The system of claim 31, the means for providing a secondary position feedback utilizes at least one of back-emf sensing, flux calculation methods, or observer-based methods.

* * * * *